June 20, 1972     J. S. PLOWMAN     3,671,139
COMPOSITE BLADE CONSTRUCTION
Filed Sept. 11, 1970
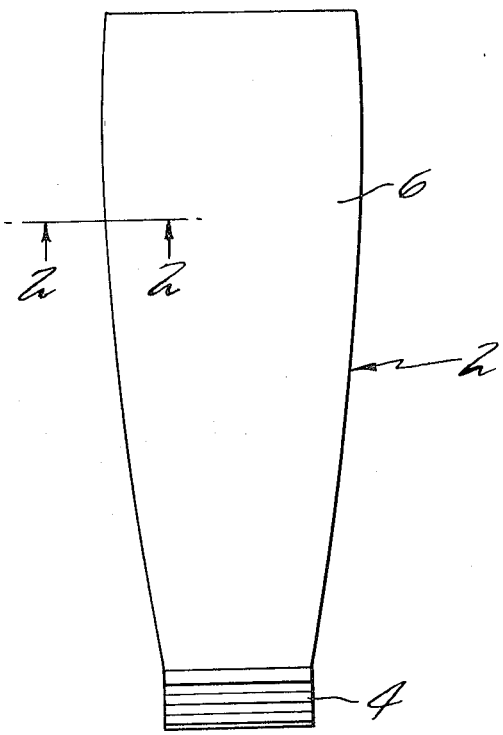
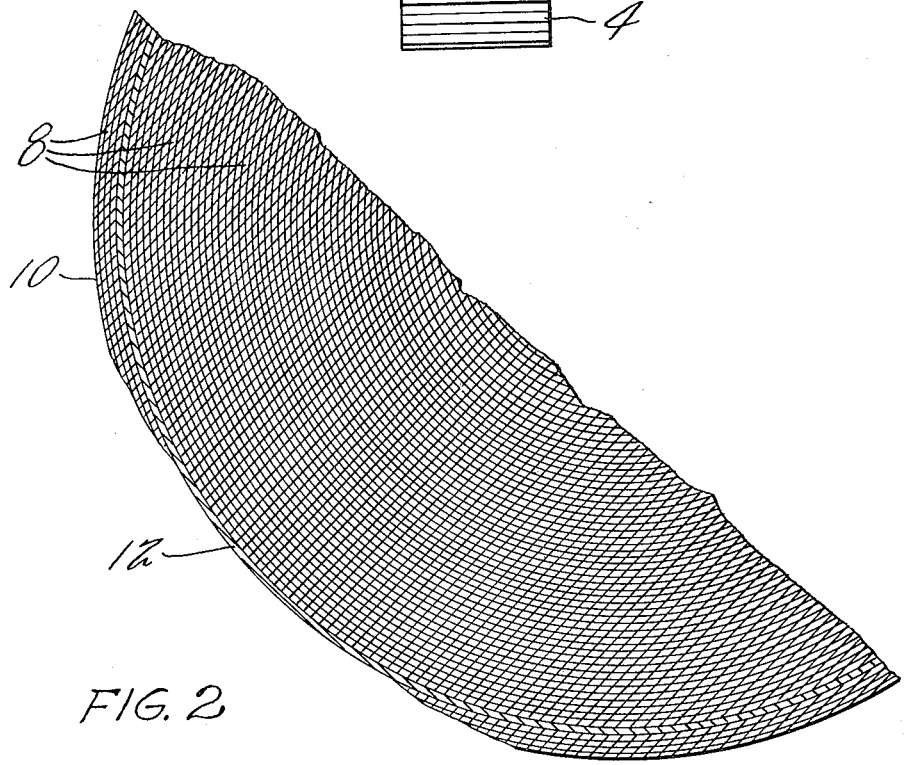
INVENTOR
JAMES S. PLOWMAN
BY     ATTORNEY

United States Patent Office 3,671,139
Patented June 20, 1972

3,671,139
COMPOSITE BLADE CONSTRUCTION
James S. Plowman, Longmeadow, Mass., assignor to United Aircraft Corporation, East Hartford, Conn.
Filed Sept. 11, 1970, Ser. No. 71,531
Int. Cl. F01d 5/28
U.S. Cl. 416—61
5 Claims

ABSTRACT OF THE DISCLOSURE

A fan blade or compressor blade is made up of a plurality of very thin plies of fibers for maximum strength and these fibers are subject to damage by foreign objects that may engage the blades specially along its leading edge and thereby weaken the blade. To permit visual inspection of a blade to determine the extent to which the plies have been worn away, one ply is made visibly different from the others and is positioned in the stack of plies at the limit position to which the blade surface can be worn away before replacement.

BACKGROUND OF THE INVENTION

Blades that are made up of a plurality of plies of parallely arranged fibers held together by a matrix produce a strong blade that is lighter in weight but these materials are less resistant to damage by foreign objects entrained in the air flowing past the blades. This is especially true in gas turbine engines used in aircraft where the air entering the compressor past the blades may have entrained foreign particles from the ground by reason of the suction effect as the engine is operating prior to and during take off and also during landing.

Further the blades may be damaged by the injection of birds or atomspheric particles such as ice crystals or hail or the like in flight. Since these composite blades are more easily damaged, it is desirable to have a visual indication on the blade at such time as the erosion or local damage may have weakened the blade to the permissible limit. Since the blades are airfoil in cross sectional configuration, inspection by gages is an extremely slow process and necessitates blade removal for the purpose of inspection and trained operators to make such inspection. Inspection is essential at reasonably short intervals because of the uncertainty when damage to the airfoil may occur.

SUMMARY OF INVENTION

The principal feature of the invention is a composite blade in which one of the plies is visibly different from the remaining plies to show readily when the several overlying plies have been damaged locally or eroded away, to the greatest extent permissible before replacement of the fan blade becomes necessary. This ply is so located as to be exposed and visible when the selected number of overlying plies have been eroded away in any areas of the blade, particularly those areas that are usually susceptible to damage for example along the leading edge. Thus, by visual inspection of the blade which is generally exposed at the inlet of the gas turbine engine and can be readily examined by technicians before the beginning of a flight, the need for replacement is immediately apparent if the differently marked ply is exposed in any area of the blade.

According to the invention when the blade is being manufactured the plies are layed up so that the outermost plies follow the contour of the blade surface and extend over substantially the entire area of the blade surface. It will be understood that these plies are extremely thin for example on the order of about .005 of an inch. One of the underlying plies is made in such a way as to be different in appearance from the plies overlying the differently marked ply as for example by coloring or physical construction so as to define a visible limit to which the overlying plies may be worn away without seriously reducing the effective blade strength and durability. When this distinctive appearance is noted on visual inspection replacement of the blade is indicated. The extent to which this distinctive appearance is visible will determine the further usable hours if any before replacement of the blade becomes necessary. It is particularly important that some visual inspection means of this type be available because of the relative thinness of the individual plies and the difficulty in determining as by gages or other mechanisms the extent of local damage or erosion because of the contours of the blade and also because of the extreme thinness of the several plies utilized in making the blade.

BRIEF DESCRIPTION OF THE FIGURES

FIG. 1 is an elevation view of a blade embodying the invention.

FIG. 2 is a sectional view along the line 2—2 in greatly enlarged dimension to emphasize the relative thinness of the plies and showing a few plies eroded away along an area adjacent to the leading edge.

DETAILED DESCRIPTION OF THE DRAWING

Referring first to FIG. 1, the invention is shown in connection with a fan blade 2 the latter being used at the inlet end of a gas turbine engine for delivery of a part of the air carried past the fan to the compressor of the gas turbine engine and the rest of the air to be bypassed around the compressor. The fan blade has a root portion 4 by which the blade is attached to the rotating structure and projecting outwardly therefrom the airfoil portion 6. In cross section, the airfoil portion is airfoil in shape and functions to move the air into the compressor and into the bypass around the compressor.

The blade shown is a composite blade which is built up in a large number of plies 8 as shown in FIG. 2, the outermost group of these plies at least extending in parallel relation to the outer surface 10 of the blade. Fan blades of this type may be made for example as shown in the copending application of Gray et al., Ser. No. 864,021, filed Oct. 6, 1969, now pat. No. 3,600,103. These plies are actually only a few mils thick and normally a very large number of plies are used in producing a fan blade of the desired thickness. The plies may be for example the boron filament type which has in many instances a tungsten core or the carbon filament type and the individual filaments of the ply are bonded together into a sheet form by a matrix which may be for example an aluminum alloy or a polyimide or epoxy.

After the large number of plies have been built up to produce the blade of the desired thickness, the assemblage is placed between the parts of a die which shape the plurality of plies into the desired configuration of the finished blade and suitable heat and pressure is applied so that the alloy forming the matrix will flow around the fibers and fill all of the voids among the fibers. The actual technique for producing the blade is not critical to this invention and further examples of one way for producing this assemblage and finished blade are described in the above-identified application.

The particular feature of the present invention is the formation of one of the several plies beneath the outermost ply in such a way that it will have a distinctively different appearance visibly than the remaining plies so that if the overlying layers are eroded as shown for example in FIG. 2 the different appearing ply 12 will be visible to anyone examining the surface of the blade carefully. This visible distinction may be made for example by having the fibers of ply 12 run in a different direction from the remaining plies or by suitably coloring the ply 12 different from the coloration of the remaining plies. Other devices by which the single ply may be made to be visibly different will readily be apparent.

Should the periphery of the blade be eroded away as suggested in FIG. 2 in which the thickness of the plies is necessarily greatly exaggerated since (as above stated) these plies may be only three to five mils in thickness, the erosion will ultimately disclose to a technician examining the blade visually that the visibly different ply has been exposed. This visibly different ply is located at the inner limit to which the blade may be eroded before it has been so weakened as not to be properly usable anymore. In this event, the technician will immediately determine the need for replacement of that blade.

This visible indication becomes particularly important since the erosion of the individual plies together with the embedding matrix cannot readily be determined because of the thinness of these plies by any other visual inspection. Because the contours of the blade are not conventional readily dimensionable shapes the usual gage device cannot be used in determining the amount of blade eroded away. Accordingly this visual inspection and indication permits a very simple determination of whether the blade is still in a condition to be used further and also will clearly indicate when it is necessary to replace anyone of the several blades forming the ring of blades used in the fan.

It will be understood that the change in appearance of the visibly different ply may be obtained in any of several ways other than those above suggested even to the extent of having the fibers of the visibly different ply made of a different material than the other filaments or utilizing a matrix material the color of which will be significantly different from that of the remaining plies. In any event, the visibly different ply has a different appearance significant enough so that when erosion occurs down to this ply even in a small area the appearance of the visibly different ply is such that over at least a portion of the eroded area the person inspecting the row of blades for damage will be able to detect the erosion to this limiting ply without any difficulty whatever.

The differently colored ply may be also made so by incorporating phosphors in the matrix of the ply, especially some of the phosphors that are made visible under infrared light. Inspection of the blades could then be done on the aircraft by shining an infrared light on the blading to make this ply visible. Alternatively luminescent dies, also sensitive to infrared or ultraviolet light could be incorporated in that ply that is to be made visibly different from the remaining plies. One form of phosphors are sold under the trade name "Radelin" by U.S. Radum Corporation and one source of the luminescent dies is the National Analine Corporation.

These plies as above stated are relatively thin on the order of only a few mils in thickness so that if the blade is usable until a depth of ¼ inch has been eroded away and assuming the thickness of the ply to be five mils it will be obvious that 25 plies would be eroded away in any particular area before the limiting visibly different ply would be exposed in any way. Accordingly, with such a thinness for each ply and so many plies to be permissibly eroded away before replacement becomes necessary it is particularly essential that readily determinable devices be used by which to measure the depth of erosion. Many times these plies are even less than five mils in thickness so that even more plies might overlie the visibly different ply and obviously as the plies become thinner the possibility of determining the extent of erosion becomes more difficult. It has been a severe problem to provide any readily usable devices by which to determine the extent of the erosion which will be accurate enough to permit realistic use of the blades when a small amount of erosion has occurred since the conventional gages are difficult to apply to a non-regular shape such as an airfoil section which varies in configuration from the root of the blade to the tip thereof.

What is claimed is:

1. A fan blade comprising
   a large number of very thin plies of high strength fibers, said plies being substantially in contact with one another,
   the outermost plies extending in parallel relation to the finished outer surface of said blade, said fibers being embedded in a matrix by which the plies and fibers are held together in forming the complete blade,
   said fiber plies being of such a thickness that erosion of a part of one or several plies from a portion of the blade will not be readily visibly discernible,
   at least one of said plies near to the outermost ply but underlying several plies being visibly different in appearance from those plies overlying said different appearing ply to provide a visual indication of the extent of the erosion of the overlying plies.

2. A fan blade as in claim 1 in which the plies are a thickness of from about three to five mils each.

3. A fan blade as in claim 1 in which the visibly different ply is located at the limit to which erosion may occur before the blade is weakened beyond safe continued use.

4. A fan blade as in claim 1 in which the fibers are boron fibers and the matrix is an aluminum matrix, the latter completely filling the spaces among the fibers in forming a solid blade.

5. A fan blade comprising
   a large number of very thin plies of high strength fibers, said plies being substantially in contact with one another,
   the outermost plies extending in parallel relation to the finished outer surface of said blade and said fibers in general extending parallel to the longitudinal axis of the blade, said fibers being embedded in a matrix by which the plies and fibers are held together in forming the complete blade,
   said plies of fibers being of such a thickness that erosion of a part of one or several plies from a portion of the blade will not be readily visibly discernible, the blade being unsafe for continued use when a predetermined number of plies have been eroded away in any area,
   at least one of said plies located at about said predetermined number of plies from the outermost ply being visibly different from the overlying plies to provide a readily visibly different appearance when a portion of said ply is exposed by erosion of the overlying plies.

References Cited

UNITED STATES PATENTS

| 2,152,943 | 4/1939 | Wilson | 152—330 |
| 2,796,215 | 6/1957 | Warnken | 416—230 |
| 2,950,083 | 8/1960 | Compton et al. | 416—230 |
| 3,098,723 | 7/1963 | Micks | 416—241 X |
| 3,132,841 | 5/1964 | Wilder | 416—230 |
| 3,261,388 | 7/1966 | Kovac et al. | 152—330 |
| 3,371,407 | 3/1968 | Forsyth et al. | 416—230 |
| 3,424,434 | 1/1969 | Palfreyman et al. | 416—230 |

FOREIGN PATENTS

| 1,186,486 | 4/1970 | Great Britain | 416—230 |

EVERETTE A. POWELL, JR., Primary Examiner

U.S. Cl. X.R.

416—229